United States Patent
Feldman et al.

(10) Patent No.: US 7,842,914 B2
(45) Date of Patent: Nov. 30, 2010

(54) OPTOELECTRONIC PACKAGE, CAMERA INCLUDING THE SAME AND RELATED METHODS

(75) Inventors: Michael R. Feldman, Huntersville, NC (US); James E. Morris, Lake Wylie, SC (US)

(73) Assignee: Tessera North America, Inc., Charlotte, NC (US)

( * ) Notice: Subject to any disclaimer, the term of this patent is extended or adjusted under 35 U.S.C. 154(b) by 121 days.

(21) Appl. No.: 11/931,767

(22) Filed: Oct. 31, 2007

(65) Prior Publication Data
US 2009/0050789 A1 Feb. 26, 2009

Related U.S. Application Data

(63) Continuation-in-part of application No. 11/127,284, filed on May 12, 2005, now Pat. No. 7,375,315, which is a continuation-in-part of application No. 10/231,483, filed on Aug. 30, 2002, now abandoned, which is a continuation-in-part of application No. PCT/US01/07053, filed on Mar. 6, 2001.

(60) Provisional application No. 60/187,034, filed on Mar. 6, 2000.

(51) Int. Cl.
*H01J 40/14* (2006.01)
(52) U.S. Cl. .................... 250/239; 250/208.1; 361/802; 361/820
(58) Field of Classification Search ............... 250/239, 250/208.1; 361/802, 820
See application file for complete search history.

(56) References Cited

U.S. PATENT DOCUMENTS

| | | | |
|---|---|---|---|
| 4,871,224 | A | 10/1989 | Karstensen et al. |
| 5,170,269 | A | 12/1992 | Lin et al. |
| 5,266,794 | A | 11/1993 | Olbright et al. |
| 5,274,250 | A | 12/1993 | Miyake et al. |
| 5,500,540 | A | 3/1996 | Jewell et al. |
| 5,638,469 | A | 6/1997 | Feldman et al. |
| 5,729,038 | A | 3/1998 | Young et al. |
| 5,764,832 | A | 6/1998 | Tabuchi |
| 5,771,218 | A | 6/1998 | Feldman et al. |

(Continued)

FOREIGN PATENT DOCUMENTS

EP     0 729 143     8/1996

(Continued)

OTHER PUBLICATIONS

Hibbs-Brenner, et al. "Packaging of VCSEL Arrays for Cost-Effective Interconnects at <10 Meters", 1999 Electronic Components and Technology Conference, pp. 747-752 (Copyright 1999, IEEE).

*Primary Examiner*—Seung C Sohn
(74) *Attorney, Agent, or Firm*—Lee & Morse, P.C.

(57) ABSTRACT

A camera includes a first substrate having top and bottom surfaces, a second substrate having top and bottom surfaces, a spacer substrate between a substantially planar portion of the top surface of the second substrate and a substantially planar of the bottom surface of the first substrate, at least two of the first substrate, the second substrate and the spacer substrate sealing an interior space, a detector within the interior space, and an electrical interconnection extending from the detector to outside the interior space.

24 Claims, 4 Drawing Sheets

U.S. PATENT DOCUMENTS

| | | | |
|---|---|---|---|
| 5,861,654 A * | 1/1999 | Johnson | 257/433 |
| 5,978,401 A | 11/1999 | Morgan | |
| 5,981,945 A | 11/1999 | Spaeth et al. | |
| 6,243,508 B1 | 6/2001 | Jewell et al. | |
| 6,448,544 B1 * | 9/2002 | Stanton et al. | 250/208.1 |
| 6,486,467 B1 | 11/2002 | Speckbacher et al. | |
| 6,566,745 B1 | 5/2003 | Beyne et al. | |
| 6,758,595 B2 | 7/2004 | Seitz | |
| 6,759,687 B1 | 7/2004 | Miller et al. | |
| 2006/0284215 A1 | 12/2006 | Maeda et al. | |

FOREIGN PATENT DOCUMENTS

WO     WO 99/40578     8/1999

* cited by examiner

FIG. 7

OPTOELECTRONIC PACKAGE, CAMERA INCLUDING THE SAME AND RELATED METHODS

CROSS-REFERENCES TO RELATED APPLICATIONS

The present application is a continuation-in-part of application Ser. No. 11/127,284, filed May 12, 2005, now U.S. Pat. No. 7,375,315 B2, which is a continuation-in-part of Ser. No. 10/231,483, filed Aug. 30, 2002, now abandoned, which is a continuation-in-part of PCT/US01/07053, filed Mar. 6, 2001, which claims priority to provisional Application Ser. No. 60/187,034, filed Mar. 6, 2000, the entire contents of all of which are hereby incorporated by reference their entirety for all purposes.

BACKGROUND OF THE INVENTION

1. Field of the Invention

Embodiments are directed to an optoelectronic package, a camera including the same, and associated methods.

2. Description of Related Art

The size of the various systems including optics integrated with an optoelectronic device, e.g., optical heads, cameras, transceivers, etc., are often too large for many desired applications and many market demands. Also, as densities of integrated circuits and system boards increase, the demand for smaller components increases. Additionally, the production process for a conventional systems requires that the optoelectronic devices be operated, i.e., "active alignment," for alignment of the optoelectronic devices and the optical elements. Unfortunately, these active alignment requirements are complex, time consuming, and relatively expensive. Further, the level of size reduction in the vertical direction of such systems is limited. In addition, the relatively large size of the elements of a system which can be manipulated is determined by the need for active alignment.

SUMMARY OF THE INVENTION

Therefore, it is a feature of an embodiment to provide an optoelectronic package that substantially overcomes one or more of the problems due to the limitations and disadvantages of the related art.

It is a feature of an embodiment to form an optoelectronic package, e.g., a camera, including optics that have been created on the wafer level on a substrate and integrated with another substrate.

It is another feature of an embodiment to form an optoelectronic package, e.g., a camera, using optics on substrates including substantially planar portions used to secure adjacent substrates.

It is yet another feature of an embodiment to form an optoelectronic package, e.g., a camera, wherein the optoelectronic package is at least partially created on a wafer level.

At least one of the above and other features and advantages of embodiments may be realized by providing a camera, including a first substrate having top and bottom surfaces, a second substrate having top and bottom surfaces, a spacer substrate between a substantially planar portion of the top surface of the second substrate and a substantially planar of the bottom surface of the first substrate, at least two of the first substrate, the second substrate and the spacer substrate sealing an interior space, a detector within the interior space, and an electrical interconnection extending from the detector to outside the interior space.

The camera may include a ledge formed by differing widths between one of the first and second substrates and the spacer substrate, the electrical contact for the detector being on the ledge. The electrical interconnection may be on a bottom surface of the camera.

At least two of the first substrate, the second substrate and the spacer may be aligned and secured on a wafer level.

One of the first and second substrates may be a semiconductor substrate. The detector may be integrated into the semiconductor substrate. The semiconductor substrate may include a CMOS integrated circuit.

At least one of the above and other features and advantages of embodiments may be realized by providing a camera, including a mount supporting a detector, an optics block having at least one optical element, and a spacer providing spacing between the detector and the optics block, the spacer surrounding the detector, the spacer and the optics block protecting the detector from environmental factors, wherein at least two of the mount, the optics block and the spacer are aligned and secured on a wafer level.

The detector may be integrated into a surface of the mount. The mount may include a CMOS integrated circuit. The camera may include an electrical interconnection extending from the detector to outside the spacer.

At least one of the above and other features and advantages of embodiments may be realized by providing a camera, including a detector, an optics block, and a spacer, separate from the optics block, providing spacing between the detector and the optics block, the detector, the optics block and the spacer being aligned and secured together, and wherein the spacer and the optics block are aligned and secured on a wafer level.

At least one of the above and other features and advantages of embodiments may be realized by providing a camera, including a mount substrate, a detector on the mount substrate, a spacer substrate, a sealer substrate, the mount substrate, the spacer substrate and the sealer substrate being vertically stacked, at least two of the mount substrate, the spacer substrate and the sealer substrate sealing the detector, an optics block having at least one optical element, the optics block being vertically stacked on the sealer substrate, and an external electrical contact for the detector provided outside the sealing.

The camera may include a ledge formed by differing widths between the mount substrate and the spacer substrate, the electrical contact for the detector being on the ledge. The external electrical contact may be on a bottom surface of the mount substrate. The sealer substrate may be a cover glass.

The mount substrate may include a CMOS integrated circuit and the detector may be an array of photodetectors integrated on a surface of the mount substrate.

At least one of the above and other features and advantages of embodiments may be realized by providing a method of making a camera, including providing a first substrate having top and bottom surfaces, providing a second substrate having top and bottom surfaces, providing a spacer substrate between a substantially planar portion of the top surface of the second substrate and a substantially planar of the bottom surface of the first substrate, at least two of the first substrate, the second substrate and the spacer substrate sealing an interior space, providing a detector within the interior space, and providing an electrical interconnection extending from the detector to outside the interior space.

At least two of the first substrate, the second substrate and the spacer may be aligned and secured on a wafer level. The method may further include forming an optical element on the first substrate. The method may further include securing the first substrate and the spacer substrates on a wafer level and vertically separated to form a plurality of optical subsystems. The method may further include securing the plurality of optical subsystems to a corresponding plurality of detectors. The method may further include vertically separating the secured plurality of optical subsystems and plurality of detectors to form a plurality of cameras.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

In the drawings, the thickness of layers and regions may be exaggerated for clarity. It will also be understood that when a layer is referred to as being "on" another layer or substrate, it may be directly on the other layer or substrate, or intervening layers may also be present. Further, it will be understood that when a layer is referred to as being "under" another layer, it may be directly under, or one or more intervening layers may also be present. In addition, it will also be understood that when a layer is referred to as being "between" two layers, it may be the only layer between the two layers, or one or more intervening layers may also be present. Like numbers refer to like elements throughout. As used herein, the term "wafer" is to mean any substrate on which a plurality of components are formed on a planar surface which are to be separated through the planar surface prior to final use. Further, as used herein, the term "camera" is to mean any system including an optical imaging system relaying optical signals to a detector system, e.g. an image capture system, which outputs information, e.g., an image.

Related, co-pending U.S. Provisional Application Ser. No. 09/690,763 entitled "Fiber Interfaces Including Parallel Arrays, Power Monitoring and/or Differential Mode Delay Compensation" filed on Oct. 18, 2000, describes a laser array and a detector array on the same substrate. In this previous application, the detector array was used for monitoring the power of the lasers, a portion of the output laser beams being directed to the detector. In accordance with the present disclosure, a light source array and a detector array are integrated on the same substrate, but, as shown, for example, in FIGS. 1 and 2 of the present application, these detectors are for receiving a signal from a remote location, not for monitoring the light source array. Of course, an additional array of monitor detectors could be provided for monitoring the output of the light sources, if present.

Figure 1:
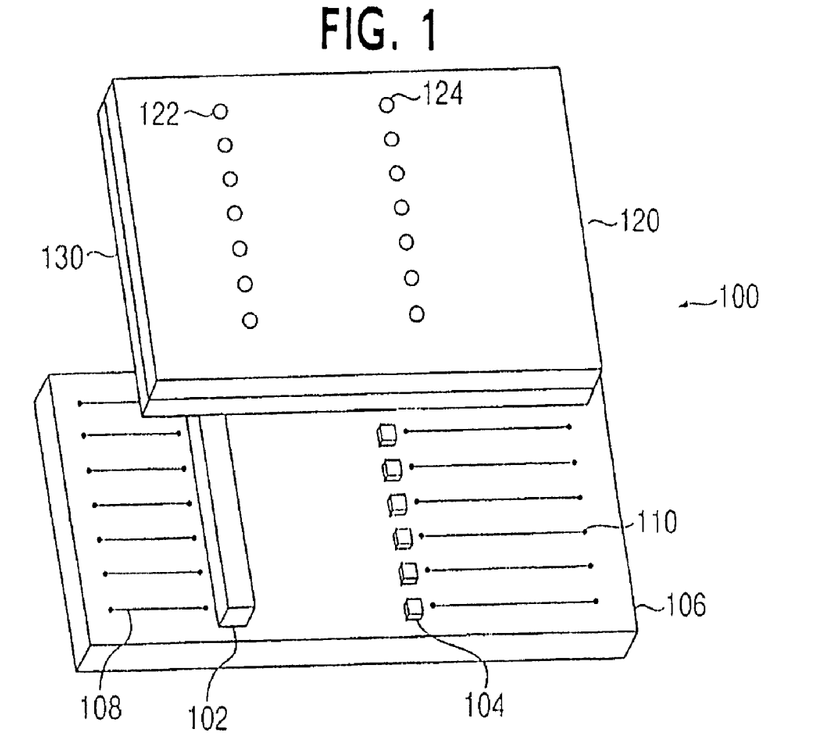
FIG. 1 illustrates an elevational exploded top view of an optical transceiver in accordance with an embodiment.

In FIG. 1, an optical transceiver 100 may include a light source array 102, here shown as a vertical cavity side emitting laser (VCSEL) array, and a detector array 104 integrated on a silicon wafer 106. Silicon interconnect tracks 108 supply power to the active elements 102, 106 and pads 110 allow the detector signals to be read out.

An optics block 120 may include two sets of integrated optics, one set 122 for the light source array 102 and one set 124 for the detector array 104. The integrated optics 122 for the light source receive light from the light source array 102 and direct the light to a desired application. The integrated optics 124 for the detectors receive light from a desired application and direct the light to the detector array 104. The optics may be diffractives, refractives or hybrids thereof and may be formed lithographically on the optics block 120.

The integrated optics 122, 124 for the light source array and the detector array may include optical elements formed on either or both surfaces of the optics block 120. Since the optics for both the light source array and the detector array are aligned simultaneously, the assembly and alignment steps required for creating a transceiver are reduced. Further, the integration allows the transceiver to be smaller and have fewer parts. Depending upon the material used for the substrate, either the detector array or the light source array may be monolithically integrated therein.

The transceiver 100 may also include a spacer 130 between the active elements and the optics block 120. The spacer 130 may be an integrated spacer surrounding the perimeter of the optics block, as shown in FIG. 1. The spacer 130 may be a separate element, formed in the optics block 120 or formed in the silicon substrate 106. The spacer 130 may serve to protect the active elements, e.g., the detector array 104 or the light source array 102, on the silicon substrate 106.

Figure 2:
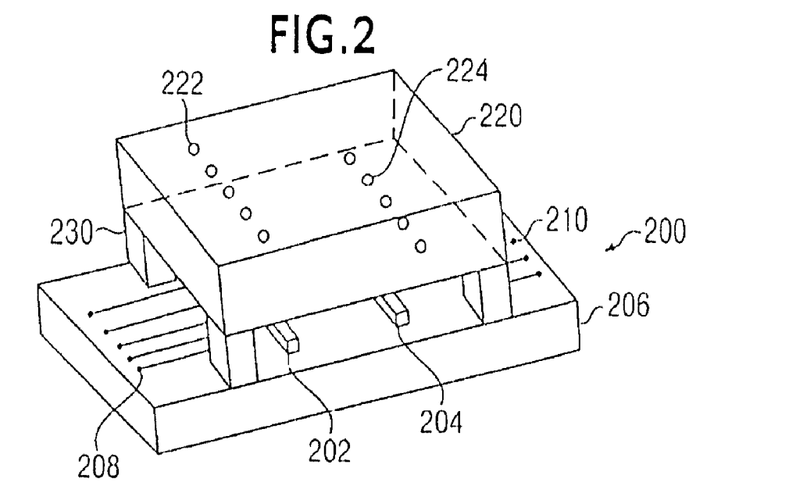
FIG. 2 illustrates an elevational side view of another optical transceiver in accordance with an embodiment.

In FIG. 2, an example of the bonded structure of a transceiver 200 is shown. Rather than having a spacer 130 around the perimeter of the optics block 120, separate spacer elements 230 may be positioned at the corners of the optics block 120. Also, optics 222 for light sources 202 may be on a different surface of the optics block 220 than optics 224 for detectors 204. The optics 222, 224 for both the light sources 202 and the detectors 204 may have the same design. Again, light sources 202 and detectors 204 may be on the same substrate 206, and one of them may be monolithically integrated therein. Silicon tracks 208 and pads 210 for providing power and signals to and from the active elements 202, 204 may also be provided on the substrate 206.

Figure 3:
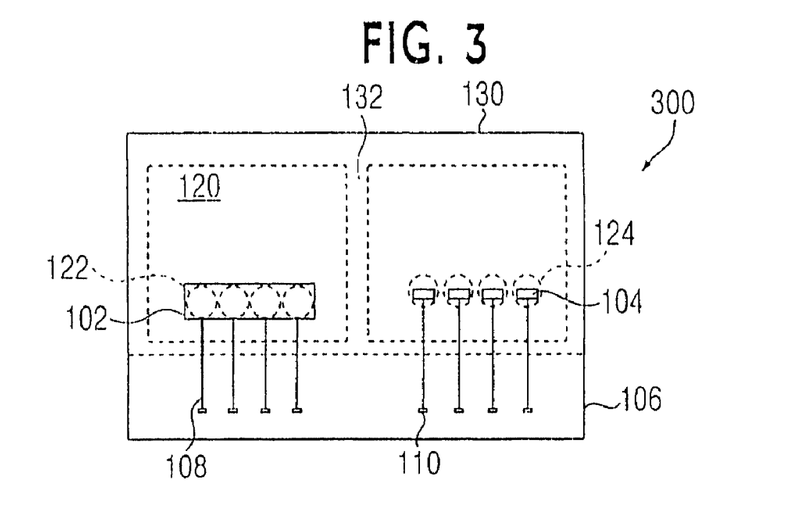
FIG. 3 illustrates a top view of another configuration of the light sources and detectors on the same substrate.

FIG. 3 illustrates a top view of a transceiver 300 in accordance with another embodiment. In FIG. 3, rather than having the active elements 102, 104 arranged in parallel arrays, the active elements form a linear array. In the particular example shown in FIG. 3, four light sources 102 and four detectors 104 are in a line. The spacing therebetween reduces cross-talk between the active devices. Corresponding optical elements 122,124 are also now in a single line. This configuration allows a standard 1×12 fiber array to be connected with the transceiver. This configuration also allows all the required interconnection to be provided on a same side of the substrate 106, thereby allowing the optics block 120 and the substrate 106 to share a common edge, which may facilitate manufacturing at the wafer level.

In any of the configurations, the components may be attached using wafer-to-wafer bonding techniques, as set forth, for example, in U.S. Pat. Nos. 6,096,155 and 6,104,690, commonly assigned, which are hereby incorporated by reference in their entirety for all purposes. Both of the above configurations allow the optics for both the transmitter portion and the receiver portion to be aligned simultaneously.

The resultant wafer having a plurality of the transceivers thereon may then be singulated, i.e., vertically separated, to form a plurality of transceivers.

Figure 4:
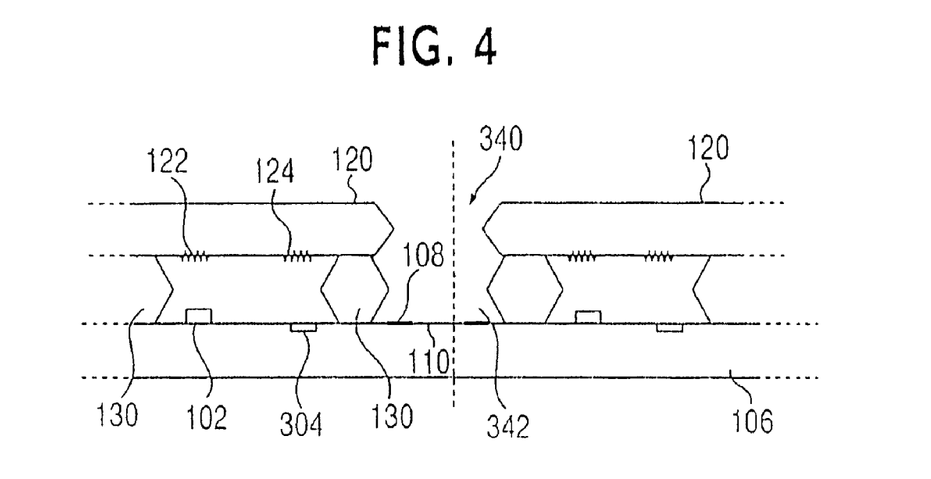
FIG. 4 illustrates a schematic side view of the creation of multiple transceivers in accordance with an embodiment.

A particular example of wafer bonding all three substrates together before separating is shown in FIG. 4. By creating spaces 340 between the sets of optical elements 122, 124 for each transceiver and spaces 342 between the spacers 130 for each transceiver, e.g., by etching in silicon as shown, while exposing the pads 110, the individual transceivers may be realized by separating the substrate 106 containing the light sources 102 and detectors 304 at the appropriate points. As shown in FIG. 4, the detectors 304 are monolithically integrated into the substrate 106. Whichever active element to be provided on the substrate has the higher effective yield is preferably the monolithically integrated element, since the monolithically integrated elements will not be able to be substituted out. Further, the metalization required for the electrical connections for both the monolithically integrated element and the additional active elements on the substrate may be formed using the same mask set as that for forming the monolithically integrated element. This helps insure precise alignment, since the active element to be mounted can use its metalization to provide its alignment, e.g., by solder self-alignment. The active elements that are to be mounted on the substrate may then be tested before being mounted. After mounting, they may be tested again and replaced if required before the wafer bonding. As used herein, bonding may include any type of attachment, including the use of bonding materials, surface tension or directly forming on the same substrate. As used herein, separating or singulating may include any means for realizing individual components, e.g., dicing or etching.

Figure 5:
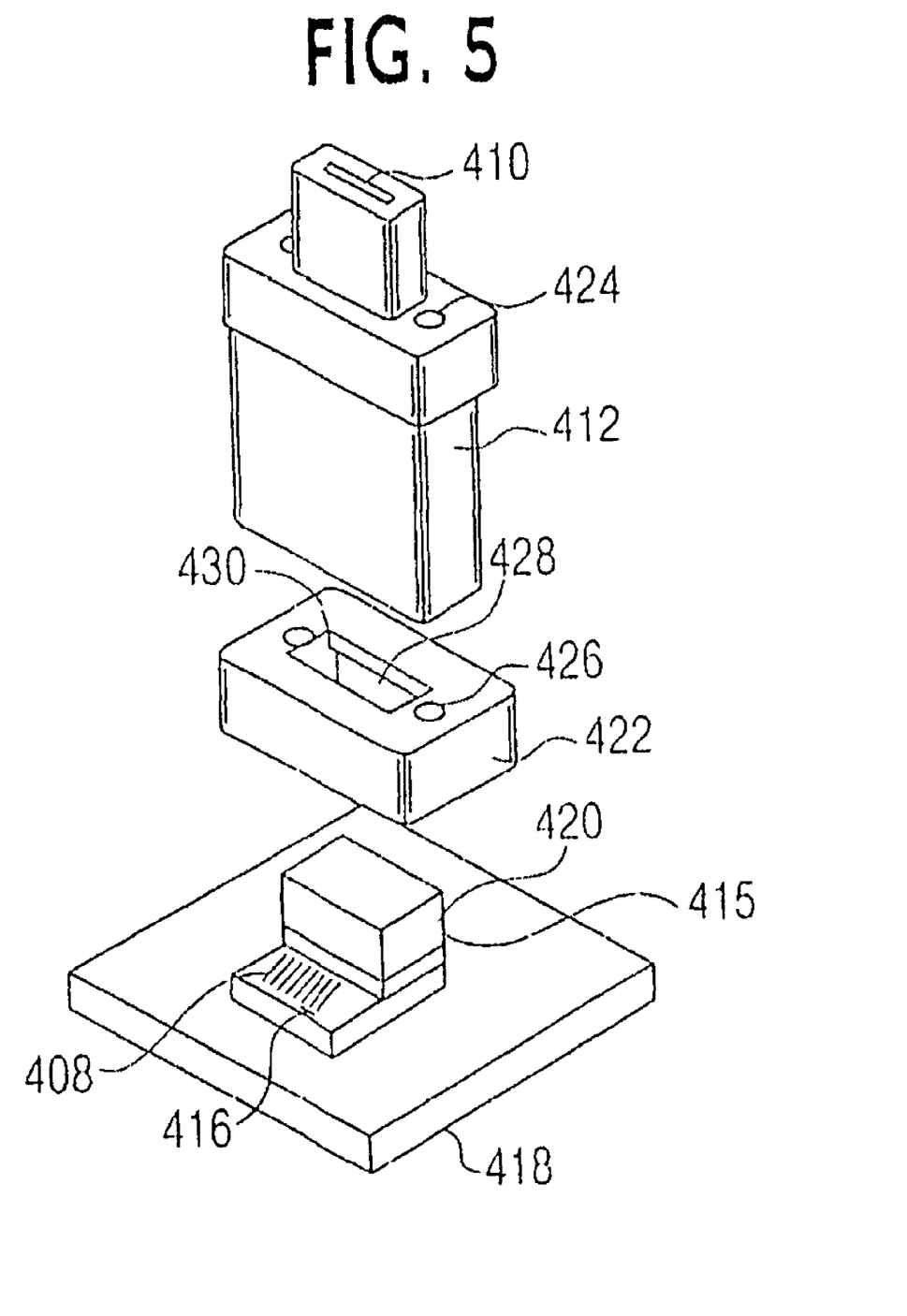
FIG. 5 illustrates an exploded elevational perspective view of an interface in conjunction with fibers in a housing and the transceiver in accordance with an embodiment.

The alignment of the active elements to the input and output ports corresponding thereto, typically fibers, is particularly important. One configuration for insuring proper alignment between the transceiver and fibers is shown in FIG. 5. As can be seen in FIG. 5, a plurality of fibers 410 are inserted into a ferrule 412. The active elements of the present invention, here the linear configuration as shown in FIG. 3, which are to be in communication with the fibers 410, are preferably provided on a silicon bench or sub-mount 416, corresponding to the common substrate 106 in FIG. 3. In turn, this silicon bench 416 is preferably provided on a substrate 418. An optics block 420 provides at least one optical element between each optoelectronic device on the sub-mount 416 and a corresponding fiber 410. The optics block 420 is preferably spaced from the opto-electronic devices by a spacer 415. The optical elements may include elements which collimate, focus, homogenize or otherwise couple or image the light. Since the optics block 420 has two surfaces, two optical elements may be provided thereon. Further, if required, additional optics blocks may be bonded to and spaced from the optics block 420 to provide additional surfaces, as with any of the previous transceiver configurations.

The spacer 415 may then be bonded, e.g., using solder or epoxy, into place on the bench 416. The bevels which can be seen on the interior surface of the spacer 415 simply arise when using silicon as the spacer and the hole therein is formed by wet etching silicon along its crystalline plane. While wet-etching is a simple way of forming the hole in the spacer, vertical side walls may be more advantageous, e.g., for load bearing. Substantially vertical side walls may be realized by dry etching silicon. Further, other materials such as ceramic, glass, plastic, may be used for the spacer 415. If the spacer 415 is transparent to wavelengths of interest, the hole therein may not be required.

Preferably, the alignment and bonding of the spacer 415 and the optics block 420 occur on a wafer level, and then diced to form respective dies which are then aligned to the bench 416. The alignment of the spacer 415 is not very sensitive, i.e., the spacer just needs to be aligned so that it does not block light between the optics block 420 and the optoelectronic device. While a spacer 415 may be formed directly on the optics block 420 itself or may be an adhesive layer, the use of a separate spacer 415 may allow larger vertical separation to be achieved. The use of a separate spacer 415 may be particularly advantageous when providing optical elements on a bottom surface of the optics block 420, since the processes for forming the optics and an integrated spacer features may interfere with each other. Finally, use of a separate spacer may allow the sealing off of the optoelectronic device to be more readily and stably achieved. Such sealing may protect the opto-electronic device from environmental factors, such as humidity.

A mechanical interface 422 aligns the optics block 420, which is already aligned with the electro-optical devices, with the fibers 410. This may be achieved by the provision of alignment features on both the mechanical interface 422 and the ferrule 412 housing the fibers 410. In the particular example shown, these alignment features consist of holes 424 in the ferrule 412, which are already typically present for aligning the ferrule with other devices, and alignment holes 426 in the mechanical interface 422. Once these alignment holes 424, 426 are aligned, an alignment pin, not shown, may then be inserted therein to maintain the aligned position. Further details of such interfaces may be found, for example, in commonly assigned, co-pending application U.S. Ser. No. 09/418,022, now U.S. Pat. No. 6,374,004, entitled "Optical Subassembly" which is incorporated by reference in its entirety for all purposes.

Other systems may incorporate an optoelectronic package including optical elements, the optoelectronic package being formed, at least partially, on a wafer level. One example of such a system is a camera, discussed in detail below.

Figure 6:
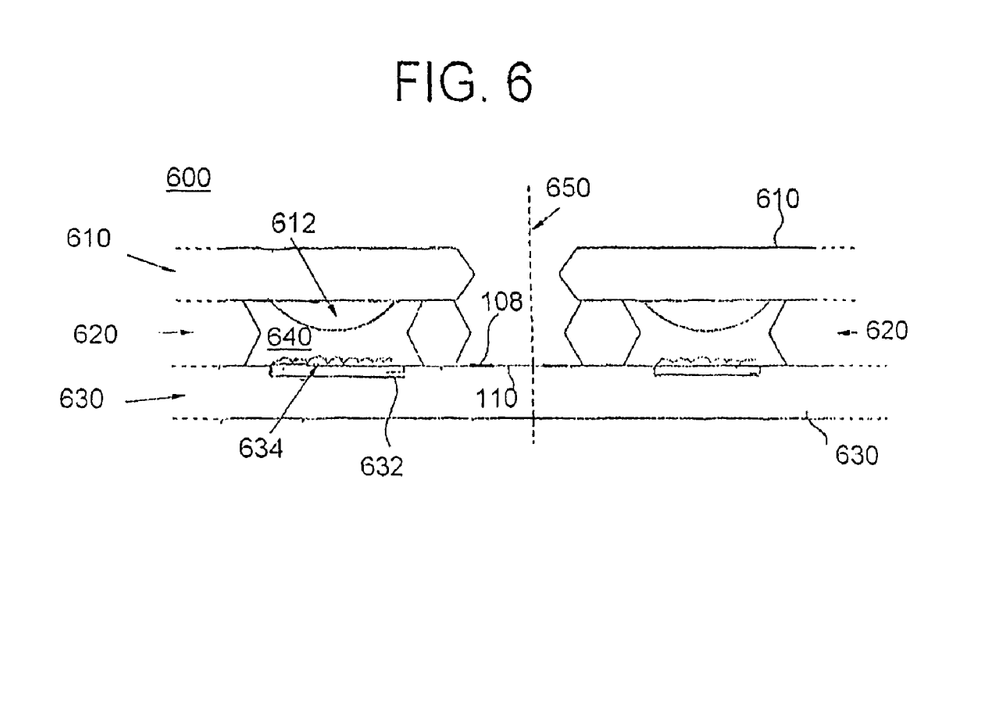
FIG. 6 illustrates a schematic side view of a camera in accordance with an embodiment.

FIG. 6 illustrates a camera 600 in accordance with an embodiment. The camera 600 may include a first substrate 610, a second substrate 620, and a sensor substrate 630. The first substrate 610, the second substrate 620 and the sensor substrate 630 may form an interior space 640. In the particular example shown herein, the first substrate 610 may include a refractive element 612 within the interior space 640. It is to be understood that any of the optical designs of embodiments may be employed, as well as variations thereon. Vertical stacking of n/2 substrates may provide up to n parallel surfaces on which optical elements may be created. As can be seen therein, and as is evident in the previous embodiments, even when optical elements are formed on these parallel surfaces, opposing substantially planar regions remain at which adjacent substrates may be readily secured, e.g., on a wafer level.

The sensor substrate 630 may include a detector array 632 and an array of microlenses 634 on top of the detector array 632. The detector array 632 may be a CMOS photodiode array. The detector array 632 may receive an image output from the refractive element 612. The detector array 632 may also be in the interior space 640.

As shown in FIG. 6, the sensor substrate 630 may be secured on a wafer level with the first and second substrates 610, 620, as discussed above with reference to FIG. 4. In particular, the first and second substrates 610, 620 may be secured with the sensor substrate 630 at a wafer level, and then the first and second substrates 610, 620 may be separated through secured planar surfaces to expose lines 108 and contact pads 110. In this particular example, the first and second substrates 610, 620 were separated from respective corresponding wafers via wet etching. However, any appropriate separation, e.g., dicing, dry etching, etc., could be used, which may result in different lateral edge shapes than illustrated in FIG. 6. Then, the resultant structure may be singulated along line 650 to form individual cameras.

Alternatively, the pads 110 could be provided after the separation of the first and second substrates 610, 620. As a further alternative, electrical contacts in electrical communication with the detector array 632 may be provided on a bottom surface of the sensor substrate 630.

Additionally, the first and second substrates 610, 620 may be separated using any appropriate method prior to being secured to the sensor substrate 630. A plurality of such separated first and second substrates 610, 620 may be secured to a corresponding plurality of sensor substrates 630 on a sensor wafer, and then the sensor wafer may be singulated to form individual cameras 600.

Figure 7:
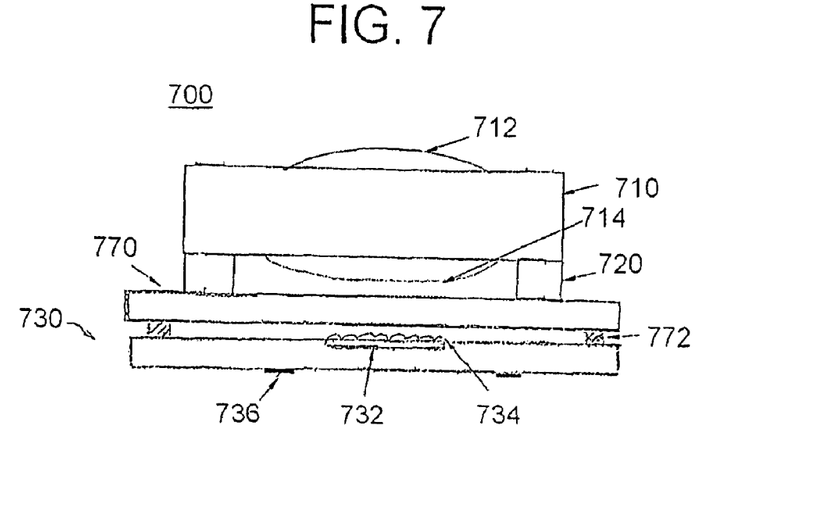
FIG. 7 illustrates a schematic side view of a camera in accordance with an embodiment

FIG. 7 illustrates a camera 700 in accordance with an embodiment. The camera 700 may include a first substrate 710, a second substrate 720 and a sensor substrate 730. The first substrate may include a first refractive element 712 on a first surface and a second refractive element 714 on a second surface. The sensor substrate 730 may include a detector array 732, an array of microlenses 734 on top of the detector array 732, and electrical contacts 736 on a bottom surface of the sensor substrate 730. The detector array 732 may be a CMOS photodiode array. The sensor substrate 730 may further include a cover glass 770 secured thereto, e.g., using an adhesive 772. The cover glass 770, together with the adhesive 772 providing separation between the cover glass 770 and the array of microlenses 734, may protect the detector array 732.

The first and second substrates 710, 720 may be secured and separated on the wafer level, and then secured to the cover glass 770 of the sensor substrate 730, e.g., using bonding material 780. Alternatively, the first and second substrates 710, 720 may be secured to the cover glass 790 of the sensor substrate 730 at a wafer level, and then singulated either by more than one process or step, as illustrated above in FIG. 6, or using a single process or step.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A camera, comprising:
   a first substrate having top and bottom surfaces;
   a second substrate having top and bottom surfaces;
   a spacer substrate between a substantially planar portion of the top surface of the second substrate and a substantially planar of the bottom surface of the first substrate, at least two of the first substrate, the second substrate and the spacer substrate sealing an interior space;
   a detector within the interior space; and
   an electrical interconnection extending from the detector to outside the interior space.

2. The camera as claimed in claim 1, further comprising a ledge formed by differing widths between one of the first and second substrates and the spacer substrate, the electrical contact for the detector being on the ledge.

3. The camera as claimed in claim 1, wherein at least two of the first substrate, the second substrate and the spacer are aligned and secured on a wafer level.

4. The camera as claimed in claim 1, wherein one of the first and second substrates is a semiconductor substrate.

5. The camera as claimed in claim 4, wherein the detector is integrated into the semiconductor substrate.

6. The camera as claimed in claim 4, wherein the semiconductor substrate includes a CMOS integrated circuit.

7. The camera as claimed in claim 1, wherein the electrical interconnection is on a bottom surface of the camera.

8. A camera, comprising:
   a mount supporting a detector;
   an optics block having at least one optical element; and
   a spacer providing spacing between the detector and the optics block, the spacer surrounding the detector, the spacer and the optics block protecting the detector from environmental factors, wherein at least two of the mount, the optics block and the spacer are aligned and secured on a wafer level.

9. The camera as claimed in claim 8, wherein the detector is integrated into a surface of the mount.

10. The camera as claimed in claim 9, wherein the mount is a CMOS integrated circuit.

11. The camera as claimed in claim 8, further comprising an electrical interconnection extending from the detector to outside the spacer.

12. A camera, comprising:
    a detector;
    an optics block; and
    a spacer, separate from the optics block, providing spacing between the detector and the optics block, the detector, the optics block and the spacer being aligned and secured together, and wherein the spacer and the optics block are aligned and secured on a wafer level.

13. A camera, comprising:
    a mount substrate;
    a detector on the mount substrate;
    a spacer;
    a sealer substrate, the mount substrate, the spacer and the sealer substrate being vertically stacked, at least two of the mount substrate, the spacer and the sealer substrate sealing the detector;
    an optics block having at least one optical element, the optics block being vertically stacked on the sealer substrate; and
    an external electrical contact for the detector provided outside the sealing.

14. The camera as claimed in claim 13, wherein the mount substrate is a CMOS IC and the detector is a image sensor integrated on a surface of the mount substrate.

15. The camera as claimed in claim 13, wherein the external electrical contact is on a bottom surface of the mount substrate.

16. The camera as claimed in claim 13, wherein the sealer substrate is a cover glass and the spacer is an adhesive.

17. A method of making a camera, comprising:
    providing a first substrate having top and bottom surfaces;
    providing a second substrate having top and bottom surfaces;
    providing a spacer substrate between a substantially planar portion of the top surface of the second substrate and a substantially planar of the bottom surface of the first substrate, at least two of the first substrate, the second substrate and the spacer substrate sealing an interior space;

providing a detector within the interior space; and providing an electrical interconnection extending from the detector to outside the interior space.

18. The method as claimed in claim 17, wherein at least two of the first substrate, the second substrate and the spacer are aligned and secured on a wafer level.

19. The method as claimed in claim 17, further comprising forming an optical element on the first substrate.

20. The method as claimed in claim 19, further comprising securing the first substrate and the spacer substrates on a wafer level and vertically separated to form a plurality of optical subsystems.

21. The method as claimed in claim 20, further comprising securing the plurality of optical subsystems to a corresponding plurality of detectors.

22. The method as claimed in claim 21, further comprising vertically separating the secured plurality of optical subsystems and plurality of detectors to form a plurality of cameras.

23. The camera as claimed in claim 1, further comprising an optical element having optical power therein on at least one surface of the top and bottoms surfaces of the first and second substrates.

24. The method as claimed in claim 17, further comprising providing an optical element having optical power therein on at least one surface of the top and bottoms surfaces of the first and second substrates.

* * * * *